United States Patent [19]

Albal

[11] Patent Number: 4,755,992
[45] Date of Patent: Jul. 5, 1988

[54] TRANSPARENT PACKET ACCESS OVER D-CHANNEL OF ISDN

[75] Inventor: Nandakishore A. Albal, Sunrise, Fla.

[73] Assignee: Racal Data Communications Inc., Sunrise, Fla.

[21] Appl. No.: 871,640

[22] Filed: Jun. 6, 1986

[51] Int. Cl.$^4$ .............................................. H04J 3/26
[52] U.S. Cl. ........................................ 370/94; 370/99; 370/110.1
[58] Field of Search ...................... 370/94, 99, 60, 88, 370/85, 110.1, 68.1

[56] References Cited

U.S. PATENT DOCUMENTS 4,597,074  6/1986  Demichelis et al. ................... 370/99
4,607,364  8/1986  Neumann et al. ..................... 370/99

OTHER PUBLICATIONS

"The OSI Reference Model", Day & Zimmerman; *Proceedings of the IEEE*, vol. 71, No. 12, Dec. 1983.
"Interface Between Data Terminal Equipment (DTE) and Data Circuit—Terminating Equipment (DCE) for Terminals Operating in the Packet Mode on Public Data Networks", *CCITT Recommendation X.25.*, (Jun. 1984–Document AP VIII—58 E).
"Services and Protocols of the Physical Layer", Frank M. McClelland, *Proceedings of the IEEE*, vol. 71, No. 12, Dec. 1983.
"Services and Protocols of the Data Link Layer", James W. Conard, *Proceedings of the IEEE*, vol. 71, No. 12, Dec. 1983.
"The OSI Network Layer: Standards to Cope With the Real World", Christine Ware, Proceedings of the IEEE, vol. 71, No. 12, Dec. 1983.
"ISDN: Users Think It's a Distant Prospect. Wrong", Brad O'Brien, Data Communications, Dec. 1985.
"Looking at the ISDN Interfaces: Issues and Answers", Brian E. Collie, Larry S. Kayser, and Antony M. Rybozynski, Data Communications, Jun. 1983.

Primary Examiner—Douglas W. Olms
Attorney, Agent, or Firm—Jerry A. Miller

[57] ABSTRACT

An improved method of providing transparent packet access to a D-channel of an ISDN, includes the step of providing a user packet including an Address field, a Control field and an Information field, for transporting to an ISDN; Extracting the Address, Control and Information fields from the the user packet; and inserting the extracted fields into an Information field of an ISDN format LAPD packet. Preferably X.25 packets are provided access to the network, and the X.25 LAPB Address, Control and Information fields are inserted into the LAPD information field. This method provides independence of protocols and reduces complexity.

6 Claims, 4 Drawing Sheets

4,755,992

TRANSPARENT PACKET ACCESS OVER D-CHANNEL OF ISDN

CROSS REFERENCE TO RELATED DOCUMENTS

The following documents provide background information helpful in understanding the present invention. These documents are incorporated by reference as though disclosed fully herein:

[1] "The OSI reference Model", Day & Zimmerman; *Proceedings of The IEEE* Vol 71, No. 12, December 1983.

[2] "Interface Between Data Terminal Equipment (DTE) and Data Circuit-Terminating Equipment (DCE) for Terminals Operating in the Packet Mode on Public Data Networks", *CCITT Recommendation X.25*. (June 1984-Document AP VIII-58 E).

[3] CCITT Recommendation I.440 (Q.920) ISDN User-Network Interface Data Link Layer-General Aspects, VIIIth Plenary Assembly, October 1984.

[4] CCITT Recommendation I.441 (Q-921) ISDN User-Network Interface Data Link Layer Specification, VIIIth Plenary Assembly, October 1984.

[5] CCITT Recommendation I.450 (Q-930) ISDN User-Network Interface Layer 3-General Aspects, VIIIth Plenary Assembly, October 1984.

[6] CCITT Recommendation I.451 (Q-931) ISDN User-Network Interface Layer 3 Specification, VIIIth Plenary Assembly, October 1984.

[7] "Services and Protocols of the Physical Layer", Frank M. McClelland, *Proceedings of the IEEE*, Vol. 71, NO. 12, December, 1983.

[8] "Services and Protocols of the Data Link Layer", James W. Conard, *Proceedings of the IEEE*, Vol. 71, NO. 12, December, 1983.

[9] "The OSI Network Layer: Standards to Coper With The Real World", Christine Ware, *Proceedings of the IEEE*, Vol. 71, NO. 12, December, 1983.

BACKGROUND

1. Field of The Invention

This invention relates generally to the field of packetized digital communications. More particularly, this invention relates to a method and apparatus for providing packetized data communication over the D-channel of an ISDN (Integrated Services Digital Network). The specific example provided relates to the transport of user data in X.25 packets over the D-channel.

2. Definitions And Abbreviations

Many of the following abbreviations and terms are used throughout this document. For ease of reference these terms are defined below:

CCITT- International Telegraph and Telephone Consultative Committee. An international body which establishes communications standards.

CO- Central Office.

DCE- Data Circuit Terminating Equipment.

DISC- Disconnect Command. Used in layer 2 to tear down an established link.

DTE- Data Terminal Equipment.

FCS- Frame Check Sequence. A sequence used to check for errors in a packet.

ISDN- Integrated Services Digital Network. A communications network which provides data and voice communications utilizing packet and circuit switched technologies.

ISO- International Standards Organization. An international body of technical experts which proposes and establishes technical standards to be followed by industry.

LAPB- Link Access Protocol Balanced. Layer 2 of X.25.

LAPD- Link Access Protocol D Channel. Layer 2 of the ISDN D channel.

OSI- Open System Interconnection. (See Reference [1.]).

PAD- Packet Assembler Disassembler. Pertinent to X.25.

Peer- Communicating entities at a given layer.

PH- Packet Handler. The entity handling X.25 packets in the network. May reside in the CO.

PSPDN- Packet Switched Public Data Network.

SABM- Set Asynchronous Balanced Mode. A layer 2 command to request the establishment of a data link connection. Applicable to LAPB and LAPD.

SAP- Service Access Point. The point of interaction between a service user and the service provider.

SAPI- Service Access Point Identifier. The SAPI is used to identify the service access point on the network side or the user side of the user-network interface.

TA- Terminal Adapter. Allows non-ISDN devices to interface to an ISDN.

Termination, Complete- Complete peer-to-peer communication exists at a given layer. All procedures required for a peer-to-peer communication are employed.

Termination, Partial- Partial procedures for peer-to-peer communication are implemented. The complete set of procedures employed in peer-to-peer communications are not utilized (e.g. Only error check conducted).

VFN- Vendor Feature Node. One or more features provided to a subscriber by a vendor (e.g. utility meter reading, videophone service, etc.).

X.25- A packet protocol defined by the CCITT. (see Reference [2.]).

"2B+D"- Two Bearer (2B) channels for carrying user data Plus One signaling (D) channel used in ISDN.

UA- Unnumbered Acknowledge. Used to acknowledge a SABM.

3. Background of The Invention

The ISO (International Standards Organization) has defined a 7 layer OSI (open systems interconnection) reference model that provides an architecture to serve as a basis for all future development of standards for worldwide distributed information systems. Thus a system conforming to OSI would be "open" to communications with any other system obeying the same standards anywhere in the world. The architecture calls for layering, which is used as a structured technique to allow the network of open systems to be logically decomposed into independent smaller subsystems.

This model is discussed in detail in References [1], [7], [8], [9] so that extensive treatment is not required here. But briefly, the three lowest layers of this model are the physical layer (layer 1), the Data Link Layer (layer 2) and the Network Layer (layer 3). The physical layer provides mechanical, electrical, functional and procedural standards to access the physical medium. The Data Link Layer (Layer D) provides the functional and procedural means to transfer data between network entities, and to detect and possibly correct errors that may occur in the physical layer. The network layer provides end to end logical connectivity. We will be concerned with Layer 2 and 3 only for purposes of this discussion.

The present invention is related to packet access to the D channel of an ISDN. By virtue of its widespread acceptance, the X.25 packet format is addressed specifically, but this is not to be limiting as other packet formats are equally applicable to the present techniques. To more readily appreciate the features and advantages of the present invention, a brief discussion of X.25 and ISDN is in order.

The X.25 recommendations, as the title of the recommendation implies, is applicable to packet-switched devices. Layer 2 of X.25 is known as LAPB. In a Packet Switched Public Data Network (PSPDN), Layer 3 data is embedded in a LAPB packet and transmitted to its destination via layer 1. In other words, a layer 3 to LAPB, and LAPB to layer 1 communication exists.

In an ISDN (Integrated Services Digital Network), "basic rate" is commonly referred to as "2B+D", referring to two information (B) channels and one signaling (D) channel. Each B channel is 64 Kbps and is the bearer channel. The D channel is 16 Kbps and is primarily used for signaling. D channel information is transmitted as packets. User data can be transported on the D channel. Present implementations restrict this user data rate to 9600 bps on the D channel. Layer 2 of D channel is known as LAPD and all D channel information (including user data) has to be in LAPD frames according to proposed standards.

The protocol that is considered for user data in the preferred embodiment is X.25 due largely to its wide acceptance in various data communication systems. The X.25 packet communication is effected by transporting the packets across the user/network interface to the packet handler (PH) which exists in the network (generally at the CO). X.25 procedures for end-to-end connectivity are transacted between the PH and the end-user devices.

User data can presently be transported on the D channel only as X.25 packets, but the present invention is not to be limited to X.25 packets. X.25 packets are specifically designated as such by using SAPI=16 in LAPD. X.25 packets are directly routed by the ISDN to the packet handler (PH) for processing the X.25 information. The Packet Handler may be internal or external to the network. While a solution has been proposed for transporting user data packets over the D Channel of ISDN, this proposed solution has several drawbacks which will be outlined below.

According to this proposed solution the X.25 data the "I" field (or Information field of the X.25 packet) at layer 3 is embedded into a LAPD packet, and this is transported across the user network interface. At the Central Office (CO), layer 2 is terminated and the Information field (I) is passed directly to layer 3 of X.25. Two possible scenarios present themselves as described below.

In the first scenario as shown in FIG. 1, X.25 is directly interfaced to ISDN, that is, the PAD is in an ISDN TA. Here the X.25 and ISDN are closely coupled to allow X.25 functionality and LAPD functionality to coexist. In this scenario, raw data is accepted from the user and layer 3 X.25 formatting is done. The X.25 layer 3 frame is accepted from the X.25 PAD and the information is transferred to the "I" field of a LAPD frame after buffering. An appropriate "C" field, "A" field and FCS for LAPD is then appended and the packet is transmitted to the network over the LAPD link.

On receiving a LAPD packet from the network, the LAPD packet is first checked to assure that a proper FCS is present. If not, the packet is dropped. If the FCS is good, the "C" field is read to determine what type of packet is being received. The "I" field is then sent to the X.25 layer 3 of the PAD. At this point an acknowledgment is sent to the network indicating that the packet has been correctly received and all counters and buffers are updated. Raw data is then extracted from layer 3 X.25, and transmitted to the user.

To summarize, communication takes place as follows:
(i) X.25 at layer 3 indicates the need for a call.
(ii) LAPD sets up a link (using SABM, UA on LAPD) between user and network indicating a packet call.
(iii) Once the call is set up, X.25 layer 3 is notified and layer 3 information is embedded into LAPD frame. LAPD is terminated at the CO-switch, while X.25 layer 3 is terminated in the PH. Close interaction between states of X.25 and LAPD exist. Therefore, all of the D channel must closely interact with X.25.
(iv) Call Termination (Using DISC on LAPD) is similar to call setup.

It should be noted that the only layer 2 entity is LAPD. LAPD is therefore responsible for all layer 2 functions like sequencing, flow control, error detection and recovery, buffering of data packets.

In a second scenario, as illustrated in FIGS. 2 and 3, an X.25 DTE Interfaces with an ISDN TA (Terminal Adapter). According to this second scenario, when a LAPB packet is received from the DTE the LAPB FCS is checked and the packet is dropped if an error is detected. If no error is detected, the value of the LAPB "C" field is placed in the "C" field of a LAPD packet.

The data link between the DTE and the TA is partially terminated. The TA accepts only those packets from the DTE that have a valid FCS (i.e only FCS checking is done). No acknowledgment is sent by the TA to the DTE on the LAPB link. The "I" field of the LAPB packet is used as the "I" field in the LAPD frame with the LAPD address (A), and FCS fields. This LAPD packet is sent to the network. At the network, layer 2 is terminated. That is, if the packet is good, a LAPD acknowledgment is sent to the user and the "I" frame is presented to (Layer 3 X.25) the PH. On receiving a LAPD packet from the network, the FCS is checked first, and the packet is dropped if an error is detected. If no error is detected, the value of the LAPD control field is placed in the "C" field of a LAPB packet. The "I" field is then transferred to the "I" field of the LAPB packet and a new FCS is calculated. The LAPB packet is then transmitted to the X.25 DTE. At the TA, the acknowledgment (LAPD) received from the network is converted to a LAPB acknowledgment and sent as a LAPB frame to the DTE. So, in effect, layer 3 X.25 is terminated between the user and the PH, while layer 2 (partial LAPB, LAPD) is terminated at the network. This implies that the parameters (modulus, window size, etc.) of the LAPB and LAPD link have to be the same.

These two schemes for interfacing X.25 with ISDN have a number of disadvantages. The following disadvantages, although perhaps not exhaustive, are indicative of the need to provide an improved interfacing scheme:

1. Close interactino between layer 3 X.25 and LAPD needs to exist. Such close coupling with LAPD implies coupling with the entire management function of D channel. Any changes in D channel or X.25 implies software changes which, with their close coupling, could be formidable.

2. Parameters of the DTE and TA have to be the same.

3. A "hybrid" Layer 2 exists between the user and network. LAPB and LAPD terminations are not clear.

4. In the case of the X.25 PAD, as mentioned above, the LAPD entity has to provide layer 2 functions for management of user data. Two of the functions which must be provided are the error detection and recovery. This is a major drawback. This implementation also implies that LAPD has to do the buffer management to prevent loss of data. This is an unnecessary burden imposed on LAPD.

Accordingly, it is apparent that there exists a need for an improved method and apparatus for interfacing X.25 packets to ISDN. Such a method and apparatus would allow layer 2 of D-Channel (LAPD) to transport this packet data with the following ideals:

a. Maintain transparency of user data
b. Achieve maximum independence of the protocols involved, to facilitate individual protocol modifications (if any), and least interaction between the protocols (independent state machines for the protocols involved).
c. Facilitate flow control, sequencing and error detection by functionally decomposing these to be handled by the appropriate protocol.
d. Achieve the above with minimum cost and technical complexity.

The present invention provides such a scheme to facilitate transport of user data in X.25 packets over the D channel achieving the goals outlined. It should be noted that the scheme is equally applicable to other packet protocols and is not restricted to X.25. X.25 has been specifically mentioned keeping in mind its practicality and wide user application base, but should only be considered an example.

SUMMARY OF THE INVENTION

It is an object of the present invention to provide an improved method and apparatus for interfacing an X.25 packets to the D channel of ISDN.

It is another object of the present invention to provide an improved method of providing transparent packet access over LAPD of ISDN.

It is a further object to provide an improved packet access to the D channel of an ISDN while achieving a high degree of independence between LAPD and packet protocols employed by the user.

It is an advantage of the present invention to provide a peer to peer layer interfacing between ISDN LAPD and packets which provides packet transparency and protocol independence.

These and other objects and advantages of the invention will become apparent to those skilled in the art upon consideration of the following description of the invention.

In one embodiment of the present invention a method of providing transparent packet access to a D-channel of an ISDN, includes the step of providing a user packet including an Address field, a Control field and an Information field, for transporting to an ISDN; extracting the Address, Control and Information fields from the user packet; and inserting the extracted fields into an Information field of an ISDN format LAPD packet.

The features of the invention believe to be novel are set forth with particularity in the appended claims. The invention itself however, both as to organization and method of operation, together with further objects and advantages thereof, may be best understood by reference to the following description taken in conjunction with the accompanying drawing.

DETAILED DESCRIPTION OF THE INVENTION

The present invention provides X.25 to D-Channel interface at Layer 2 only in all cases (X.25 DTE and PAD). This scheme is equally applicable to both scenarios mentioned above without change. Both protocols can independently change with minimum effect on the operation of the other.

Figure 2:
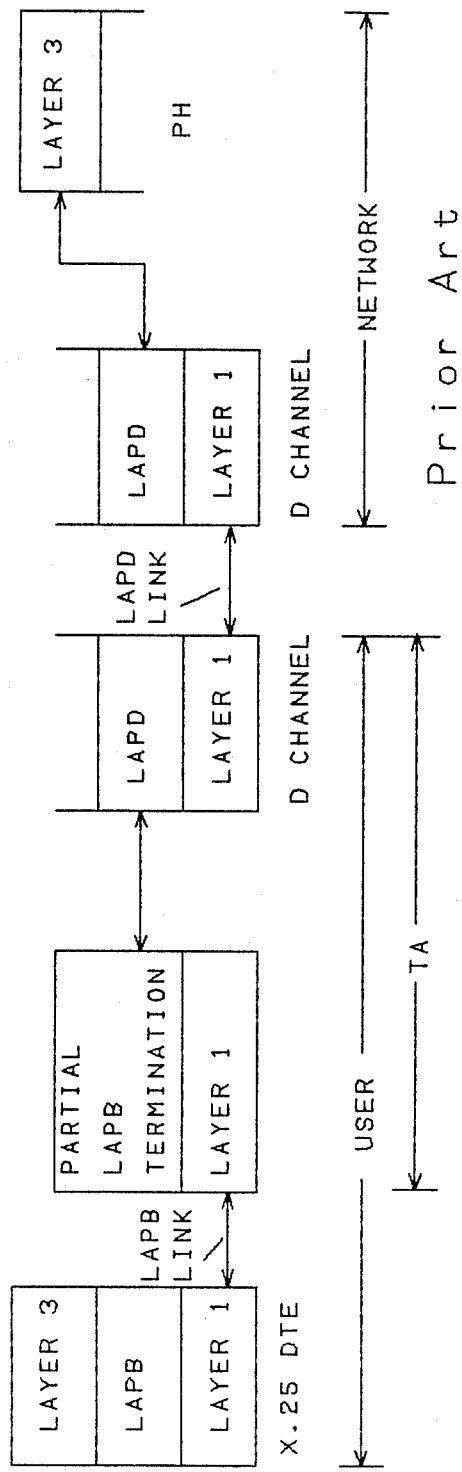
FIG. 2 is a drawing of another scenario of the layers of an ISDN packet interface of the prior art.

An overview of the present invention may be had with reference to FIGS. 4 through 7 as follows. For ease of understanding, the numbering of the interfaces of FIG. 4 and the packet format sections of FIG. 5 have been made identical. A similar numbering convention is used with FIGS. 6 and 7. Also, FIGS. 2 and 4; 1 and 6; and 3 and 5 have been located adjacent one another to facilitate ease of comparison.

Figure 6:
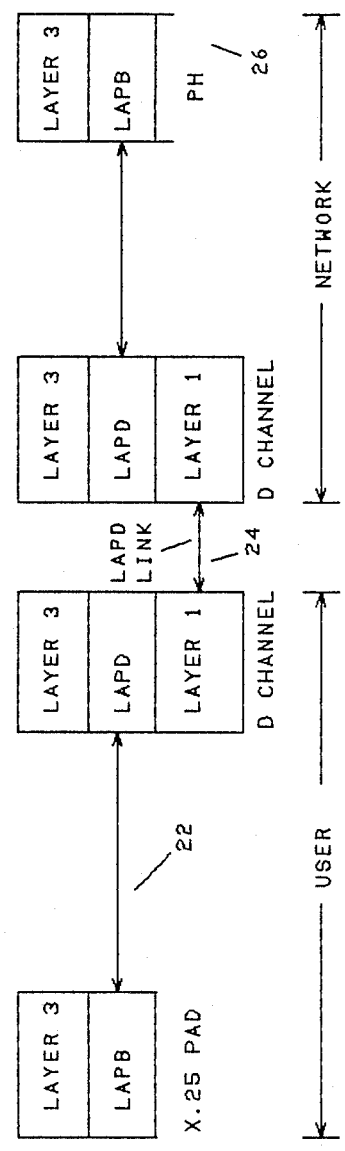
FIG. 6 shows the layers of the ISDN packet interface of a second embodiment of the present invention.
Figures 3, 5:
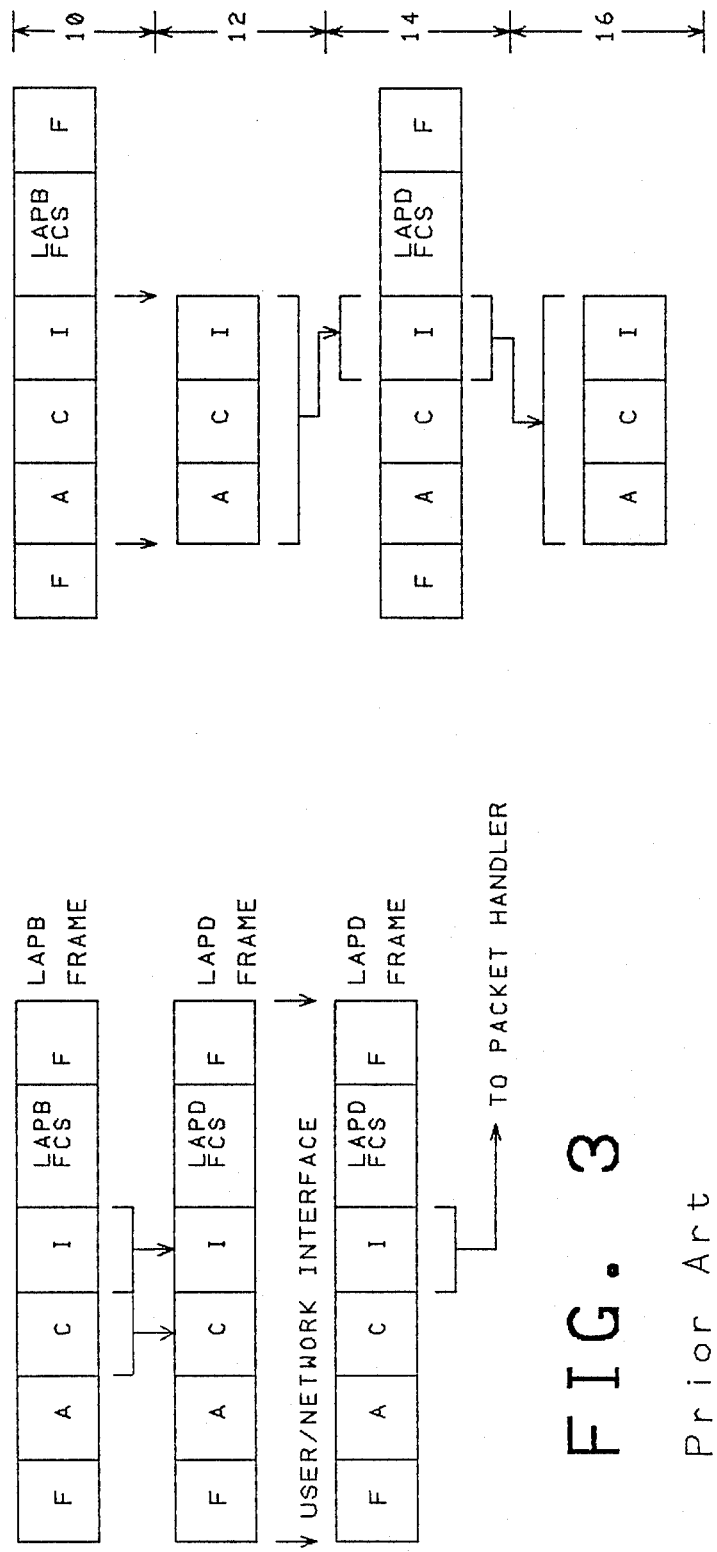
FIG. 3 shows how the packetized information is manipulated by the ISDN packet interface of one of the prior art.
FIG. 5 shows how the packetized information is manipulated by the present invention.

A first embodiment of this invention is illustrated in FIGS. 5 and 6. According to the present embodiment, the X.25 layer 3 is embedded in a LAPB frame. The LAPB frame (without the flags and FCS, as they are pertinent only in LAPB) is further embedded into a LAPD frame with a new Address (A), Control (C) and FCS fields (pertinent to LAPD) and sent to the network. It is assumed that the LAPB frame is error free. In case of error, the LAPB frame is dropped without any negative acknowledgment. That is, error recovery is the function of the X.25 entity (which may exist within or external to a TA) which determines that an error has occurred if no acknowledgment is received within a reasonable time period.

At the network, the LAPD frame is checked for error, good LAPD frames are stripped of address (A), control (C), FCS and the LAPD "I" field (which contains LAPB Address, Control and Information fields) is given to the PH at Layer 2 of X.25. Again, error recovery here is the function of the X.25 entity.

For call set up and teardown, the LAPD to LAPB coupling need only understand the standard setup and teardown messages (SBME, UA, DISC) and be transparent to all other messages. Since the Control field of LAPB is retained intact, the control parameters of the LAPB can be different from LAPD, the only condition being that the LAPB parameter values be less than or equal to value of the LAPD parameters (e.g. window size, modulus, sequence #).

Figure 4:
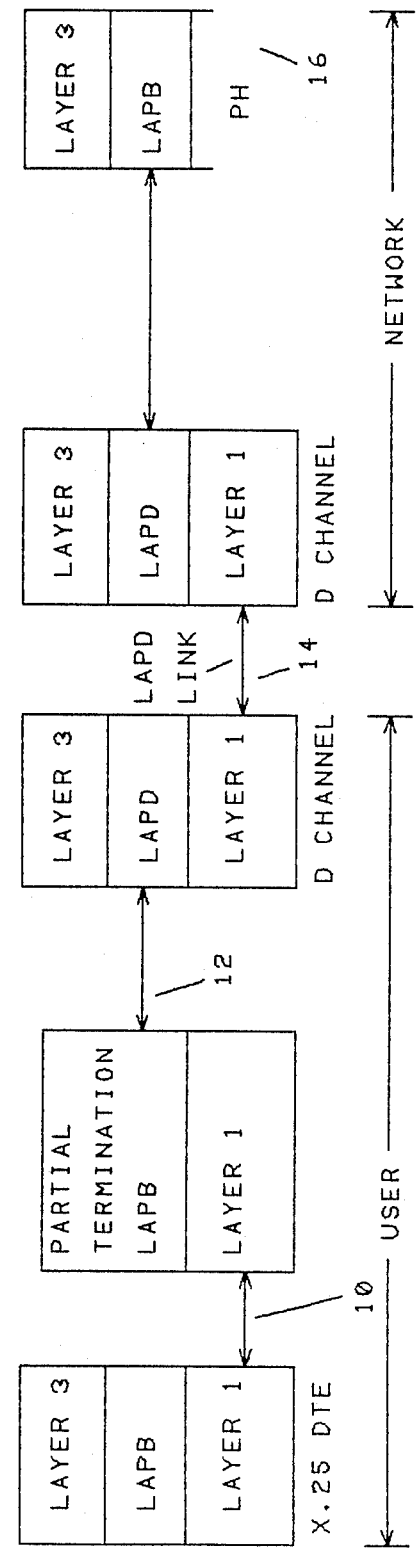
FIG. 4 shows the layers of the ISDN packet interface of the present invention.

In FIGS. 4 and 5, the layer communication between the LAPB and LAPD is indicated along with the termination boundaries. FIG. 4, shows an external X.25 DTE wherein section 10 of FIG. 5 (present at interface 10 of FIG. 4) shows the LAPB frame with X.25 layer 3 in the "I" field. Section 12 of FIGURES shows the Address (A), Control (C) and Information (I) field of LAPB with the Flag (F) and FCS stripped as it appears at interface 12 of FIG. 4. This "A", "C" and "I" combination is used as the "I" field in the LAPD frame and sent across the user network interface 14 as in section 14 of FIG. 5. Section 16 of FIG. 5 indicates that the "A", "C", and "I" field of the original LAPB frame given to the LAPB entity in the Packet Handler at 16.

Flow control is between the X.25 entities, and the intervening ISDN network does not modify any aspect of it. Sequentiality of data is similarly maintained end to end. Error detection is done on both the LAPB link at the boundaries of section 10 and 12 and the LAPD link at section 14 of FIGS. 4 and 5.

Figure 7:
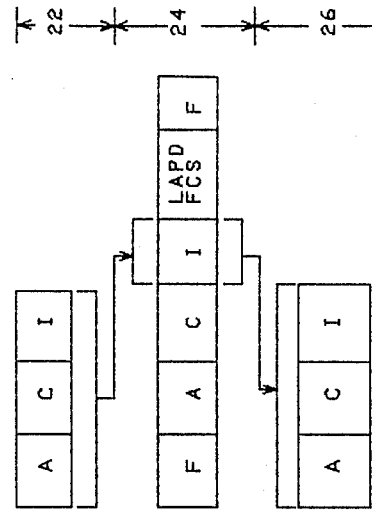
FIG. 7 shows how the packetized information is manipulated by a second embodiment of the present invention.
Figure 1:
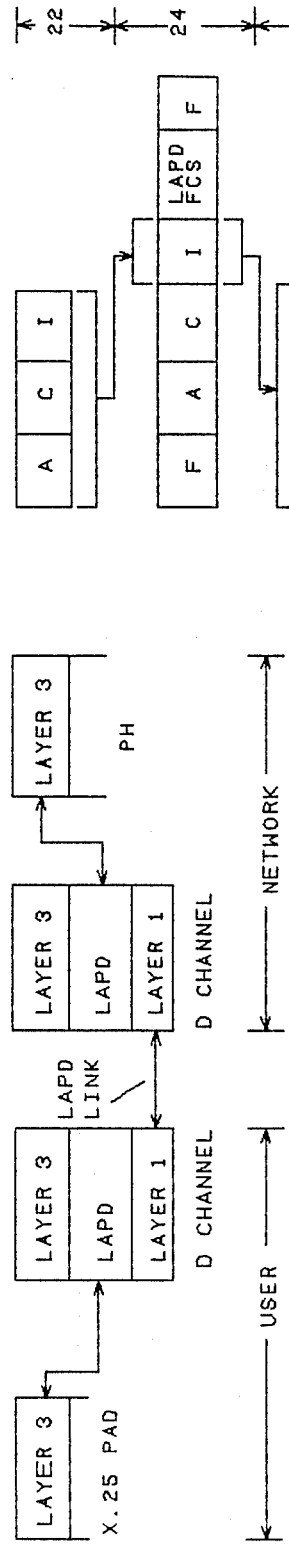
FIG. 1 is a drawing of one scenario of the layers of an ISDN packet interface of the prior art.

Turning now to FIGS. 6 and 7, a second embodiment an X.25 PAD within the TA communicating with an ISDN is illustrated. In this environment, communication occurs at layer 2 as indicated by 22. Otherwise, this embodiment operates the same as that described in conjunction with FIGS. 4 and 5. The "A", "C" and "I" fields at 22 are inserted into the "I" field at 24 and removed at 26 to effect end-to-end communication.

Figure 8:
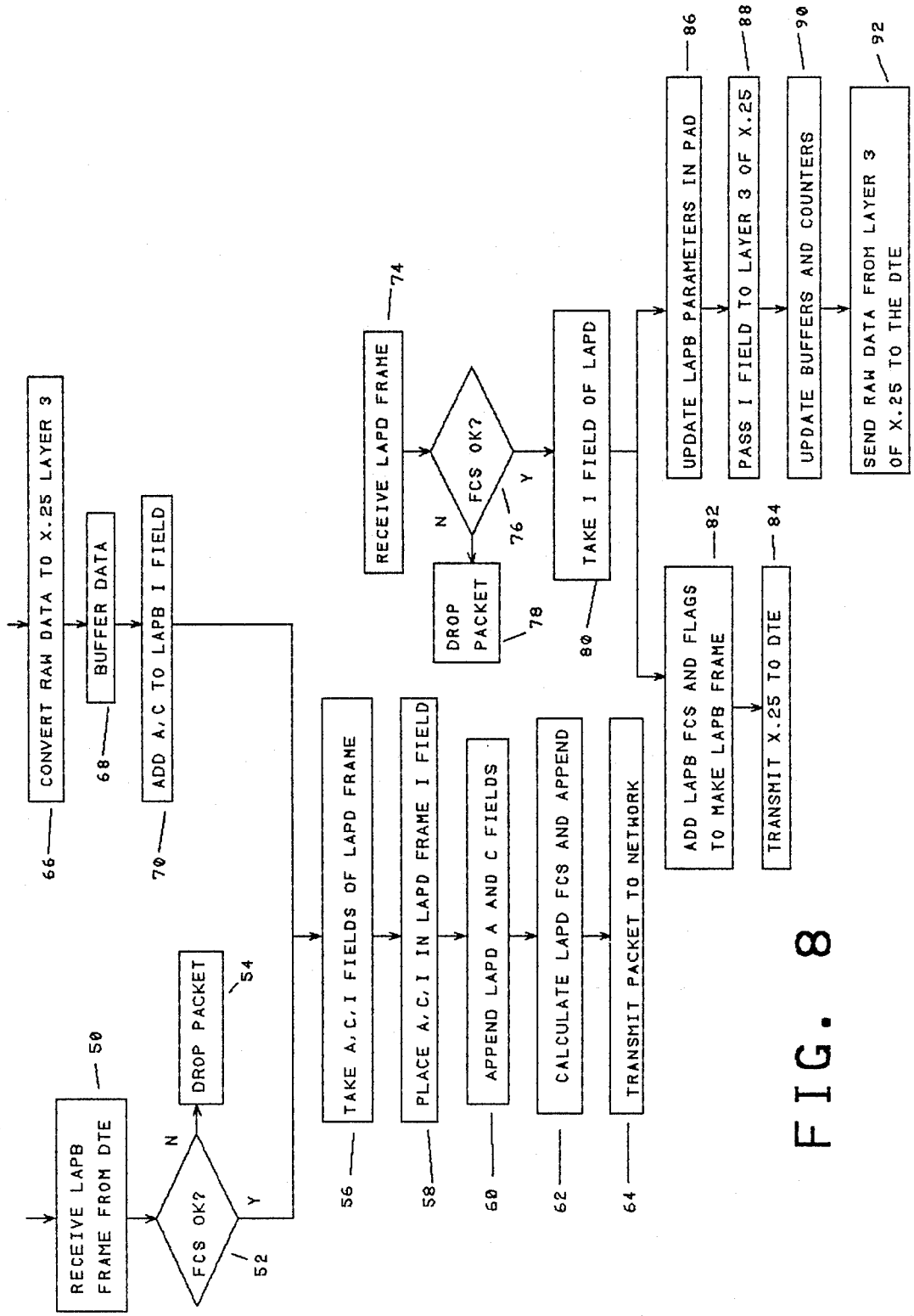
FIG. 8 shows a flow diagram of the process of the present invention.

Turning now to FIG. 8, a flow chart of the operation of the present invention is shown. This flow chart may be entered at block 50 for the case of an external X.25 DTE. At block 50 a LAPB frame is received from the DTE and at 52 the frame is inspected to determine if FCS is correct. If not the packet is dropped at 54. If no error exists, the "A", "C" and "I" fields are extracted from the LAPB frame at 56. At 58 these extracted "A", "C" and "I" fields from the LAPB frame are inserted directly into the "I" field of a LAPD frame. At 60, the appropriate LAPD "A" and "C" fields are appended. At 62 a new FCS is calculated and appended to the frame. At 64 the completed packet is transmitted on the network separated by framing characters.

In the case of raw data being received from a dumb terminal, the flow chart may be entered at block 66 where the raw data is accepted and formatted to conform to Layer 3 X.25 format. The data is buffered at 68 and an "A" and "C" field are added at 70 to produce a frame containing "A", "C" and "I" fields performing to LAPB standards. This "A", "C" and "I" field is then processed from block 56 through 64 in the same manner previously described. Communication in the opposite direction begins with receipt of a LAPD frame at 74 which is checked at 76 to determine that FCS is correct. If not, the packet is dropped at 78. If FCS is correct at 76, the "I" field of the LAPD frame is extracted at 80. In the case of an X.25 DTE, control is passed from block 80 to 82 where a LAPB FCS and flags are appended to make up a LAPB frame. This frame is transmitted to the X.25 DTE at 84.

In the other scenario wherein a PAD forms a portion of the ISDN TA, control is passed from step 80 to step 86 wherein the LAPB parameters in the PAD are updated. At step 88 the "I" field is given to layer 3 of X.25 and 90 the counters and buffers are updated. At step 92 raw data is transmitted from layer 3 of X.25 to the DTE.

The present invention has the advantage of easy and inexpensive implementation and maintenance. Protocol coupling is at a minimum so that changes in one do not affect the other except for changes in call set up and breakdown. The 2 protocols need not "understand" each other for the present arrangement to function. This arrangement also has the potential to handle virtually any user protocol transparently. Also, this approach handles both scenarios outlined above esentially identically, thus providing significant simplification of hardware and software. In addition, this approach produces less of a "hybrid" of the two protocols so that each protocol maintains its independence of the other.

This arrangment, however, is not without some minor disadvantages in that it is not a method employed presently by ISDN switches and may have to be made a standard for wide application with respect to X.25 usage. Also, it does not conform to a strict OSI model with the inclusion of 2 embodied layer 2 protocols. These limitations, however, are nonexistent in custom ISDN systems which need not adhere to the OSI model.

Since the OSI 7 layer model is largely a mechanism for standardizing computer communication, the present invention will be most advantageously implemented using a programmed digital computer. Those skilled in the art and familiar with the seven layer OSI model will readily understand how to adapt existing hardware and software to realize the present invention in light of the above discussions. Of course, the detailed design of buffering, error checking, control of flow, etc., will depend heavily upon the exact application and implementation, but this is unimportant to the understanding of the inventive contributions disclosed herein. Those skilled in the art will also readily appreciate that a wide array of applications, such as D channel access to VFN features, readily lend themselves to use of the present invention.

Thus it is apparent that in accordance with the present invention an apparatus that fully satisfies the objectives, aims and advantages is set forth above. While the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and broad scope of the appended claims.

What is claimed is:

1. A method of providing transparent packet access on a data link layer protocol of an ISDN, comprising the steps of:
   providing a LAPB user packet including an address field, a control field and an information field, for transporting to an ISDN;
   extracting said address, control and information fields from said user packet; and
   inserting said extracted fields into an information field of a single ISDN format LAPD packet.

2. The method of claim 1, wherein said providing step includes providing an X.25 format LAPB packet.

3. The method of claim 1, further including the step of providing a LAPB packet to a packet handler.

4. The method of claim 2, further including the step of providing said LAPB packet to a packet handler.

5. The method of claim 4, further including the steps of:
   extracting said information field from said LAPD packet; and
   appending a LAPB FCS and flags to said LAPD information field to form an X.25 format LAPB packet.

6. A method of providing transparent packet access to a data link layer protocol of an ISDN, comprising the ordered steps of:
   providing a LAPB user packet in X.25 LAPB format including an address field, a control field and an information field, for transporting to an ISDN;
   extracting said address, control and information fields from said user packet;
   inserting said extracted fields into an information field of a single ISDN format LAPD packet; and
   extracting said LAPD packet information field from said LAPD packet.

* * * * *